J. F. BARNS.
CORN HOOK.
APPLICATION FILED MAR. 16, 1921.
1,403,002. Patented Jan. 10, 1922.
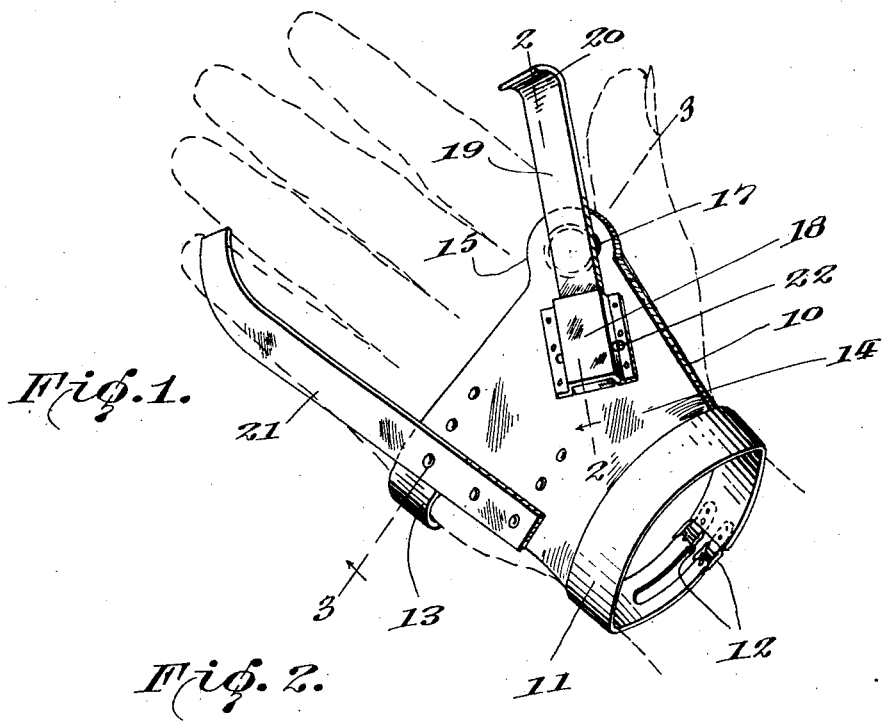
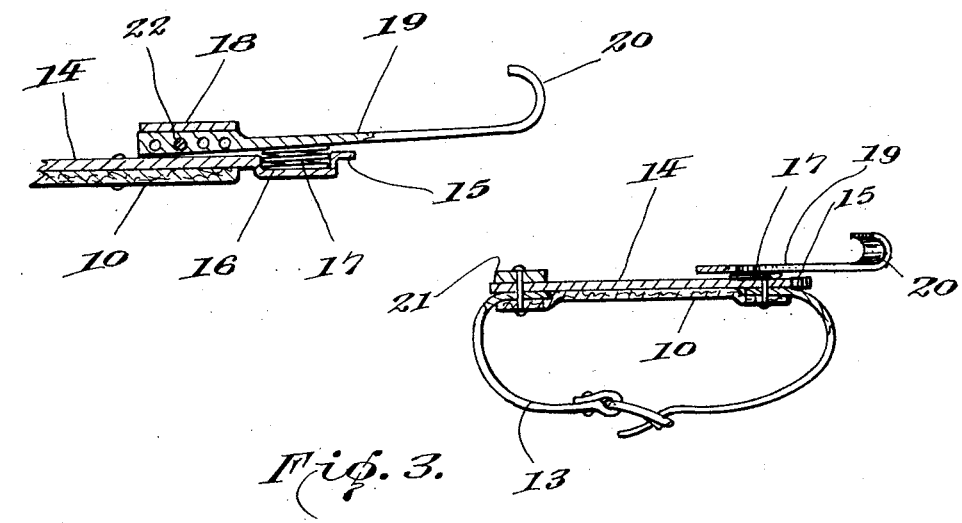
Inventor:
James F. Barns.
Attorneys.

UNITED STATES PATENT OFFICE.

JAMES F. BARNS, OF NEW HAMPSHIRE, OHIO.

CORN HOOK.

1,403,002.

Specification of Letters Patent. Patented Jan. 10, 1922.

Application filed March 16, 1921. Serial No. 452,848.

*To all whom it may concern:*

Be it known that I, JAMES F. BARNS, a citizen of the United States, residing at New Hampshire, in the county of Auglaize, State of Ohio, have invented certain new and useful Improvements in Corn Hooks; and I do hereby declare the following to be a full, clear, and exact description of the invention, such as will enable others skilled in the art to which it appertains to make and use the same.

This invention relates to new and useful improvements in harvesting implements and particularly to hand harvesting implements.

One object of the invention is to provide a hand device by means of which the ears of corn may be quickly and easily broken off without the hand having to grasp the stalk or ear of the plant.

Another object is to provide a device of this character wherein the ear gripping member is resiliently held, and is adjustable to suit the user and the character of the work.

Other objects and advantages will be apparent from the following description when taken in connection with the accompanying drawing.

In the drawing:

Figure 1 is a perspective view of the invention applied to the hand of the user.

Figure 2 is an enlarged longitudinal sectional detail view through the hook and support, on the line 2—2 of Figure 1.

Figure 3 is an enlarged transverse sectional view of the same parts on the line 3—3 of Fig. 1.

Referring particularly to the accompanying drawing, 10 represents a sheet of leather or other suitable material having the wrist band portion 11, provided with the buckles 12. At a suitable distance from the wrist band portion are the straps 13 by means of which the member 10 is secured on the palm of the hand, the straps passing across the back of the hand. Secured on the major portion of the leather 10 is a metal plate 14 having an enlarged projection 15 at one of its outer corners which is formed with a depression or socket 16 seating a coil spring 17. Secured to the plate, inwardly of the socket 16 is an angularly arched plate 18 through and under which is slidably disposed the stem 19 of the hook 20. The outer portion of the stem 19 rests on the upper end of the coil spring 17, which spring exerts its upward force to hold the stem and hook away from the plate 14. The hooked end of the stem 19 projects outwardly beyond the socketed projection in position to be easily engaged with the ear of corn to be broken off.

Extending obliquely from the other outer corner of the plate 14 is a curved hook blade 21, which is adapted to be used to break the stem of the ear of corn from the stalk.

As clearly seen in Figure 1, of the drawing, the device is secured on the palm of the hand with the hooked stem 19, extending outwardly in parallel relation to the thumb while the hook blade 21 extends outwardly adjacent the little finger of the hand of the operator.

The hand is moved to engage the hook with the body of the ear of corn and the hook blade brought into contact with the ear adjacent stalk at the proper distance below the hook, after which the operator so manipulates the device as to press the hook blade against the butt of the ear close to the stalk to sever it.

Disposed removably through the sides of the plate 18 and engaging with the stem 19 to retain the same in proper position with respect to said plate, is a key 22.

What is claimed is:

A corn hook comprising a flexible hand attached member, a metal plate mounted on the flexible member, said members being disposed on the palm of the hand of the user, a socketed projection on one corner of the plate, a spring seated in the socket of the projection, a support on the plate adjacent the socket, and a hook having its stem adjustably supported in said support and urged outwardly by said spring and in position to be passed into engagement with the outer end of an ear of corn by the operator's thumb.

In testimony whereof, I affix my signature, in the presence of two witnesses.

JAMES F. BARNS.

Witnesses:
PAUL YOESTING,
JNO. C. WAGONER.